Sept. 27, 1955      C. I. BURKE      2,718,668

METHOD OF MAKING FISH LURES

Filed July 11, 1952

INVENTOR.
CHARLES I. BURKE
BY
*Louis Chayka*
ATTORNEY.

United States Patent Office 2,718,668
Patented Sept. 27, 1955

2,718,668
METHOD OF MAKING FISH LURES
Charles I. Burke, Traverse City, Mich.
Application July 11, 1952, Serial No. 298,404
3 Claims. (Cl. 18—59)

My improvement pertains to a method of making artificial lures simulating the appearance of lower forms of animal life, the forms including crustaceans, grubs, or insects, of which the corn borer, a mayfly, or stonefly nymph are a good example.

The object of my improvement is to produce lures which will be a convincing imitation of the form and color of the respective creatures as seen in nature. A more specific object of my improvement is to produce lures which will include a translucent shell or skin of a color different than that of the body of the lure as a whole, but in which said shell or skin will fuse in part with the subsurface portions of the lure. The fusion will eliminate any layer or strata formation and will impart to the lure an appearance of depth.

Figure 1:
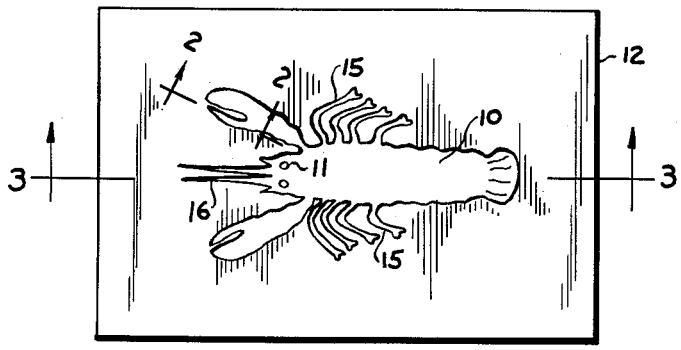
Figure 2:
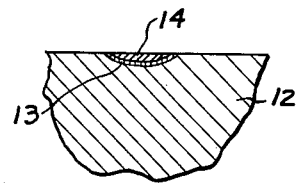
Figure 3:
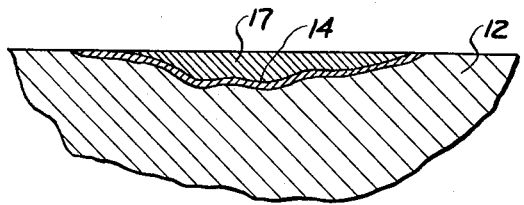
Figure 4:
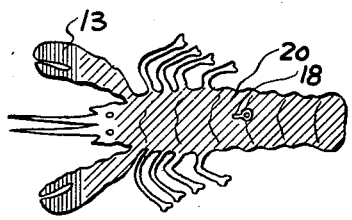
Figure 5:
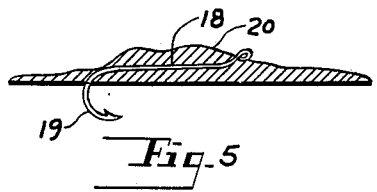

I shall now describe my improvement with reference to the accompanying drawing in which:

Fig. 1 is a top view of a mold for a lure;
Fig. 2 is a sectional view on line 2—2 of Fig. 1;
Fig. 3 is a sectional view on line 3—3 of Fig. 1, both Figs. 2 and 3 disclosing two layers of the substance out of which the lure is made prior to a fusion thereof;
Fig. 4 is a top view of a lure made in a mold and disclosing limited surface areas of a color different from that of the rest of the body;
Fig. 5 is a longitudinal sectional view of a lure disclosing the arrangement of a fish hook carried by said lure.

Similar numerals refer to similar parts throughout the several views.

In the practice of my method I employ open face molds best made of metal, the molds having a flat upper surface and concave areas therein for reception of the substance which is to be formed into lures. I make the lures out of synthetic, resinous material known as polyvinyl resins, such as Geon, which in hardness possesses properties between rubber and rigid thermoplastics, said Geon being non-flammable, odorless, and resistant to water, acids, alkalis, most organic solvents, oils, fats, and greases.

Since the plastic materials to be used in making the lures are to be in a liquid or semi-liquid condition, it will be understood that said Geon must also be in such a state. It is for this purpose that Geon, which is available commercially in a powder form, is dispersed in a plasticizing agent such as, for instance, di-octyl-phthalate. The viscosity of the mixture may be increased or decreased as desired by varying the proportion of the plasticizing agent to the plastic material, such as said Geon.

Later on, when exposed to heat in a mold, as will be described herein, the liquid or semi-liquid plastic material will solidify.

It will be understood that Geon is only one example of vinyl resins which may be used for the purpose of making the lures according to my method, and that, similarly, the plasticizer named by me is but one of a number of plasticizers suitable for the purposes desired by me.

In making the lures I have to use, as a rule, the above-said plastic material of more than one color, as the shell of a lure or parts of the surface thereof may have a coloration different from other parts. A crawfish shown in the drawings will serve as an illustration.

To begin with, the eyes of the crawfish will be made of black plastic. A small quantity of the resinous material pigmented black is deposited manually by means of a brush or a rod with a spatulated end into small circular sockets 11 in a mold which as a whole is identified by numeral 12. The plastic is to be of high viscosity to avoid infusion into adjoining plastics.

The claws are to have portions thereof tinted bright red, but the red tint is to be confined to the surface alone. Accordingly, the cavity defining each claw is painted first by means of a brush with a plastic of low viscosity and of the desired color so as to deposit in the mold a film-like coating 13. Any excess color material is wiped off.

Immediately thereupon the red tinted film and the black spots forming eyes are covered with a thin layer 14 of a plastic of low viscosity and a light brown tint, the layer extending all over the surface of the mold so as to represent the shell of the crawfish. The same layer extends into shallow grooves 15 which are to form legs of the crawfish and into grooves 16 in order to form antenna-like tentacles or feelers. The layer is very thin, being really a film, and may be best applied by means of a brush.

As the next step in my method I build up the core of the mold by pouring into the mold over the last-named layer 14 a sufficient quantity of a green-gray plastic material 17 until it fills the remaining free space within the mold.

As a rule, the plastic so applied will slightly overflow the face of the mold and will have to be removed before the contents of the mold will be subjected to a curing process. The operation of removing the surplus spilling over the face of the mold beyond the engraved or carved out areas of the mold is best carried out by means of a scraper having a knife-like blade. This, I found out by experimentation, can best be made out of a semi-rigid polythene plastic. One reason for this choice is that this plastic has a certain softness and when the blade made of this material is drawn over the surface of the mold with a light pressure against its surface, it will clear it of all the surplus of a plastic overflowing said surface without leaving thereon any filmy deposit, and without damaging or pulling out any plastic even within the shallow and fine engraving which forms a part of the mold. As a result, all the parts of the lure will come out of the mold clear-cut and well-defined conforming to the most delicate outlines of said mold. The second reason for the choice of said material is that polythene is one of the few plastics which will not swell or deteriorate by the action of the solvents within the plastics of the mold.

As the fish lure is to include a fish hook, the shank 18 of such a fish hook 19 is dipped into the plastic core 17, the position of the hook in the lure being shown in Fig. 5.

At this stage the resinous plastic materials of which the lure is made are ready to be cured. This is done by placing the mold plate 12 upon a hot plate heated by any suitable means to a temperature of approximately 350 degrees, the required period during which the lures are to be exposed to said temperature being, on the average, five minutes. It will be understood that the exact length of the period will depend upon the thickness of the body of the lure.

Upon expiration of the curing period the mold plate 12 is cooled, preferably by having the lower part thereof immersed in water, whereupon the lure may be removed from its mold.

As the filmy lower layers of the plastic within the mold are of low viscosity, allowing their mutual infusion, the completed lure will show no laminations nor any demarcations between the individual layers or films and the body of the core. The pigments of the surface portions of the lure will remain on the surface, but will not effect a partly translucent appearance of the body thereof. Light rays will penetrate the outer portions of the body and reach the core of a somewhat different color and will impart to the lure the appearance of live body tissues.

After having described my method and the lure made according thereto, what I wish to claim is as follows:

1. A method of producing a fish lure simulating the form and coloring of a lower form of animal life, such as crustacean, a reptile, or an insect, the method calling for use of a mold in an open-face mold plate and for employment of liquid and semi-liquid plastics heat solidifiable of different colors, the method comprising depositing in a mold a plastic of high initial viscosity and of one color over selected areas, such as eye sockets to form eyes, and depositing a film of a plastic of low initial viscosity over the areas calling for a color different from the main coloring of the body surface of the lure as a whole, depositing a layer of a plastic of a contrasting color and low initial viscosity over the areas already covered by the first-named plastic of high viscosity and by said film and over the still uncovered areas within the mold to form an outer shell of the lure, filling the remaining space in the mold to the top level of the mold with a plastic of a color different from the color of the plastic which is to form said shell, to build the core of the lure, imbedding the shank portion of a fish hook within the plastic designed to form the core of the lure, heating the mold with the plastics therein by exposing it to a heat source from below until the plastics have solidified, cooling the mold and its contents, and removing the solidified lure from the mold.

2. A method of producing a fish lure simulating the form and coloring of animal life, such as the crustaceans, reptiles, and insects, the method calling for an open face mold and for employment of semi-liquid, translucent, heat solidifiable plastics tinted in a variety of colors, the method comprising depositing a colored plastic material of high initial viscosity over selected areas of the mold, depositing over the areas covered by the high viscosity plastic material, and the areas free thereof, a film of a differently colored plastic of a low initial viscosity, the film to complete the outer shell of the lure, filling the remaining space in the mold with a differently colored plastic of low viscosity to the top level of the mold to form the core of the lure, imbedding in the last-named plastic the shank of a fish hook, exposing the plastic within the mold to heat to cause the outer shell and the core to solidify into a unit, quickly cooling the mold and its contents, and removing the finished lure therefrom.

3. A method of producing a fish lure simulating the form and coloring of animal life, such as crustaceans and insects, the method calling for the use of an open-faced mold and for employment of liquid and semi-liquid heat solidifiable plastics of different colors, the method comprising depositing in the mold a plastic of high initial viscosity and of one color over selected areas, such as sockets for the formation of simulated eyes, depositing a film of a low viscosity plastic and of a different color over other selected areas, depositing a layer of a plastic of still another color and of low viscosity over the still uncovered areas and the areas already covered by plastics to complete the outer shell of the body of the lure and to form members projecting therefrom, filling the remaining space within the mold up to its top with a low viscosity plastic to form a core of the lure, imbedding the shank of a fish hook in the core, curing the plastics within the mold by exposing them to temperature of about 350 degrees Fahrenheit until the plastics have solidified, cooling the mold and its contents, and removing the solidified lure therefrom.

References Cited in the file of this patent

UNITED STATES PATENTS

| Number | Name | Date |
| --- | --- | --- |
| 208,581 | Falvey | Oct. 1, 1878 |
| 1,735,674 | Copeland | Nov. 12, 1929 |
| 2,116,994 | Bear | May 10, 1938 |
| 2,144,388 | Quasbarth | Jan. 17, 1939 |
| 2,273,700 | Feuerstein | Feb. 17, 1942 |
| 2,341,999 | Lennington | Feb. 15, 1944 |
| 2,500,494 | Jeffers | Mar. 14, 1950 |